United States Patent
Chien

(10) Patent No.: US 8,989,961 B2
(45) Date of Patent: Mar. 24, 2015

(54) METHOD OF CONTROLLING INTERACTION BETWEEN MOBILE ELECTRONIC DEVICE AND IN-VEHICLE ELECTRONIC SYSTEM AND DEVICES USING THE SAME

(71) Applicant: HTC Corporation, Taoyuan County (TW)

(72) Inventor: Ho-Sung Chien, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 10 days.

(21) Appl. No.: 13/859,736

(22) Filed: Apr. 10, 2013

(65) Prior Publication Data

US 2013/0274997 A1 Oct. 17, 2013

Related U.S. Application Data

(60) Provisional application No. 61/623,945, filed on Apr. 13, 2012.

(51) Int. Cl.
*G06F 17/00* (2006.01)
*H04M 1/725* (2006.01)
(Continued)

(52) U.S. Cl.
CPC ............ *G06F 17/00* (2013.01); *H04M 1/72527* (2013.01); *H04M 1/72577* (2013.01);
(Continued)

(58) Field of Classification Search
CPC .............. G01C 21/34; G01C 21/3492; G01C 21/3697; G01C 21/3691; G01G 1/096833; B60W 20/104; B60W 20/106; B60W 20/1062; H04M 1/6033; H04M 1/6075; H04M 1/6083; H04M 1/72577; H04M 1/72527; H04L 67/30; H04L 67/303; H04L 11/306; B60R 11/0241

USPC ............ 701/36, 49, 538; 340/438; 455/456.4, 455/418, 420

See application file for complete search history.

(56) References Cited

U.S. PATENT DOCUMENTS

| | | | | |
|---|---|---|---|---|
| 6,965,787 | B2 * | 11/2005 | Kindo et al. | 455/569.2 |
| 8,145,199 | B2 * | 3/2012 | Tadayon et al. | 455/418 |
| 8,204,649 | B2 * | 6/2012 | Zhou et al. | 701/36 |
| 8,290,480 | B2 * | 10/2012 | Abramson et al. | 455/418 |

(Continued)

FOREIGN PATENT DOCUMENTS

| | | |
|---|---|---|
| EP | 2439914 | 4/2012 |
| WO | 2011047045 | 4/2011 |
| WO | 2012005773 | 1/2012 |

OTHER PUBLICATIONS

"Office Action of European Counterpart Application", issued on Sep. 20, 2013, p. 1-p. 8, in which the listed references were cited.

*Primary Examiner* — Thomas G Black
*Assistant Examiner* — Peter D Nolan
(74) *Attorney, Agent, or Firm* — Jianq Chyun IP Office

(57) ABSTRACT

The present disclosure provides a method of controlling interaction between a mobile electronic device and a in-vehicle electronic system, a mobile electronic device using the same method, and a in-vehicle electronic system unit using the same method. The method may include establishing a connection between the mobile electronic device and the in-vehicle electronic system. The mobile electronic device may then receive a profile setting from the in-vehicle electronic system through the connection which could be a cable connection or a wireless connection. The mobile electronic device would control transmission and reception of data to the in-vehicle electronic system based on the profile setting of the in-vehicle electronic system, wherein the setting varies based on the role of the in-vehicle electronic system.

24 Claims, 6 Drawing Sheets

(51) Int. Cl.
*H04W 4/02* (2009.01)
*H04W 76/00* (2009.01)
*H04M 1/60* (2006.01)
*H04L 29/08* (2006.01)
*H04W 4/00* (2009.01)

(52) U.S. Cl.
CPC ............... *H04W4/02* (2013.01); *H04W 76/00* (2013.01); *H04M 1/6083* (2013.01); *H04M 1/7253* (2013.01); *H04L 67/34* (2013.01); *H04W 4/001* (2013.01); *H04L 67/12* (2013.01); *H04L 67/306* (2013.01)
USPC .............................. 701/36; 455/418; 455/420

(56) References Cited

U.S. PATENT DOCUMENTS

| | | | |
|---|---|---|---|
| 8,315,617 B2 * | 11/2012 | Tadayon et al. | 455/418 |
| 8,527,013 B2 * | 9/2013 | Guba et al. | 455/569.2 |
| 8,700,408 B2 * | 4/2014 | Miyauchi et al. | 704/275 |
| 8,706,349 B2 * | 4/2014 | Rector et al. | 701/36 |
| 8,750,853 B2 * | 6/2014 | Abramson et al. | 455/418 |
| 2011/0105097 A1 | 5/2011 | Tadayon et al. | |
| 2011/0137520 A1 | 6/2011 | Rector et al. | |
| 2012/0095643 A1 * | 4/2012 | Bose et al. | 701/32.8 |
| 2012/0220283 A1 * | 8/2012 | Tadayon et al. | 455/418 |
| 2012/0268294 A1 * | 10/2012 | Michaelis et al. | 340/905 |
| 2013/0244625 A1 * | 9/2013 | Brakensiek et al. | 455/414.1 |

* cited by examiner

METHOD OF CONTROLLING INTERACTION BETWEEN MOBILE ELECTRONIC DEVICE AND IN-VEHICLE ELECTRONIC SYSTEM AND DEVICES USING THE SAME

CROSS REFERENCE TO RELATED APPLICATION

This application claims the priority benefits of U.S. provisional application Ser. No. 61/623,945, filed on Apr. 13, 2012. The entirety of the above-mentioned patent application is hereby incorporated by reference herein and made a part of specification.

TECHNICAL FIELD

The present disclosure generally relates to a method of controlling interaction between a mobile electronic device and a in-vehicle electronic system, a mobile electronic device using the same method, and a in-vehicle electronic system unit using the same method.

BACKGROUND

Presently, an average automobile could be equipped with more electronic features than a number of buttons and rotary dials, and consequently a collective interface equipped with a single touch screen and few buttons has been utilized in order to adequately account for all the control needs of a motor vehicle. The collective interface could generally be referred to as an "in-vehicle electronic system" but could also be identified by other labels such as an infotainment system, an in-car entertainment system, or a head unit. These features could range from basic automotive features such as the climate control, radio station tuning, music player control, to more non-basic features such as telephone functions, text messaging, internet surfing, GPS navigational system, satellite radio, rear view camera activation, night vision assistance, gaming systems, television services, and so forth. The in-vehicle electronic system may in fact be used to control and display almost everything on the vehicle including even features which are traditionally operated by buttons or switches external to the in-vehicle electronic system such as controls for seat adjustments or sun roofs.

However, at this point in time, the processing hardware of an average smart phone would out-perform most in-vehicle electronic systems as a smart phone would possess more computing powers. A smart phone could also host a higher quantity of non-basic features and applications than an in-vehicle electronic system and is usually equipped with 3G which could be utilized to download various applications. Instead of purchasing a vehicle with all the functions and features which would have been readily available in one's a smart phone, a technology has recently been developed to enable a consumer to plug one's smart phone into one's in-vehicle electronic system in order to extend its functionality by harnessing the functions and features which already exists in the smart phone.

FIG. 1 illustrates a mobile electronic device 102 interacting with an in-vehicle electronic system 101. The in-vehicle electronic system 101 would normally be situated in the upper part of the center of the dashboard in the front row of a vehicle and right next to a steering wheel 103 and in between the front side driver's seat 104 and the front side passenger's seat 105. The in-vehicle electronic system 101 would include a display panel 111 integrated in the upper part of the center of the dashboard. The display panel would typically be a liquid crystal display (LCD) and would span between 6 to 12 inches in width, and the display panel 111 could be coupled with capacitive input sensor to form a touch screen. Through a hierarchical menu displayed on the display panel 111, soft buttons, knobs, and dials could be used to replace mechanical switches. However, below the display panel 111, there may still be a control interface 112 to provide controls such that a user may turn off the display panel 111 and still control functions and features within a vehicle or to operate vehicular control functions when the display panel 111 is used as a proxy viewing device by an external host such as when the display panel 111 is used to interact with a mobile electronic device 102. The control interface 112 which provides interface functions to a user would typically include hardware inputs such as buttons, switches, knobs, and dials.

When a mobile electronic device 102 is plugged into the in-vehicle electronic system 101, the operating system of the in-vehicle electronic system 101 would usually switch the in-vehicle electronic system 101 to a remote viewing mode or an alternative operating mode which would essentially in some way synchronize the control and the display between the mobile electronic device 102 and the in-vehicle electronic system 101. When the mobile electronic 102 device is unplugged from the in-vehicle electronic system 101, the operating system of the in-vehicle electronic system 101 would resume its normal operation.

When an in-vehicle electronic system 101 interacts with a mobile electronic device 102, the interaction may proceed according to a predefined protocol. The protocol could be a customized protocol which is unique for each manufacturer, or otherwise the protocol could be a standardized protocol which could allow different brands of smart phones to be plugged into in-vehicle electronic systems produced by different manufacturers. One standardized protocol could be for example the MirrorLink standard which has been established by the automotive industry teaming up with consumer electronics to form the Car Connectivity Consortium on March, 2011.

Besides the potential difficulties of forming standards ahead, the integration between a mobile electronic device and an in-vehicle electronic system could pose another challenge which is related to the issue of driver distraction. With various entertaining applications accessible to a driver through one's mobile electronic device, the driver could be operating a motor vehicle with divided attention or even taking one's eyes off the road. According to more recent studies done on driving safety, it has been discovered that when a driver looks at the screen of the in-vehicle electronic system rather than the road, the driver is more prone to traffic accidents according to an exponentially increasing probability.

Moreover, many countries in the world have already passed laws prohibiting a driver from speaking on a phone or using text messages while driving. In the United States, many states and territories have banned the use of mobile phones while driving, and even more states have banned text messaging for drivers. Meanwhile, debates ensue as for how to regulate and limit the contents of potentially distracting applications accessible to one's in-vehicle electronic system. Therefore, when a driver elects to use one's mobile electronic device in conjunction with one's in-vehicle electronic system, additional safety measures could be adopted in order to curtail various distractions which may divide one's driving attention, but while certain features could still be made accessible so that one may take advantage of some functions and features of one's mobile electronic device without getting sidetracked by the various distractions when driving.

SUMMARY OF THE DISCLOSURE

Accordingly, the present disclosure proposes a method of controlling interaction between a mobile electronic device and a in-vehicle electronic system, a mobile electronic device using the same method, and a in-vehicle electronic system unit using the same method.

In one of the exemplary embodiments, the proposed method is a method of controlling interaction between a mobile electronic device and an in-vehicular electronic system from the perspective of the mobile electronic device, and the method includes the steps of establishing a connection with the in-vehicle electronic system. After the connection has been established, the in-vehicle electronic system would transmit a profile setting to the mobile electronic device through the established connection. The mobile electronic device would then control the transmission and reception of data with the in-vehicle electronic system based on the profile setting, wherein the profile setting would vary based on the role of the in-vehicle electronic system.

In one of the exemplary embodiments, the role of the in-vehicle electronic system may include a driver in-vehicle electronic system and a passenger in-vehicle electronic system. In one of the exemplary embodiment, the role of the passenger in-vehicle electronic system may further be specified as a front seat passenger in-vehicle electronic system or a back seat passenger in-vehicle electronic system.

In one of the exemplary embodiments, the profile setting between the role of the driver in-vehicle electronic system and the role of the passenger in-vehicle electronic system would be the same. In this case, the interaction between the mobile electronic device and the in-vehicle electronic system would be the same regardless whether the in-vehicle electronic system is the driver in-vehicle electronic system or the passenger in-vehicle electronic system.

In one of the exemplary embodiments, the profile setting between the role of the driver in-vehicle electronic system and the role of the passenger in-vehicle electronic system would be different. In this case, the interaction between the mobile electronic device and the in-vehicle electronic system would be the different based on whether the in-vehicle electronic system is the driver in-vehicle electronic system or the passenger in-vehicle electronic system.

In one of the exemplary embodiments, the mobile electronic device restricts the transmission and reception of data with the in-vehicle electronic system if the role of in-vehicle electronic system is the driver in-vehicle electronic system and the mobile electronic device would not restrict the transmission and reception of data with the in-vehicle electronic system if the in-vehicle electronic system were the passenger in-vehicle electronic system.

In one of the exemplary embodiments, the restriction of the transmission and reception of data is such that the transmission and reception of data is for incoming calls and/or music only.

In one of the exemplary embodiments, the restriction of the transmission and reception of data is such that the transmission and reception of data would be unrestricted for all roles under circumstances such as when the vehicle is parked or in a complete stop.

In one of the exemplary embodiments, the connection between the mobile electronic device and the in-vehicle electronic system could be a cable connection through a serial interface or could be a direct wireless connection.

In one of the exemplary embodiments, the proposed method is a method of controlling interaction between a mobile electronic device and an in-vehicular electronic system from the perspective of the in-vehicular electronic system, and the method includes the steps of establishing a connection with the mobile electronic device. After the connection has been established, the in-vehicle electronic system would transmit a profile setting to the mobile electronic device through the established connection. The in-vehicle electronic system would then transmit and receive data with the mobile electronic device based on the profile setting, wherein the profile setting would vary based on the role of the in-vehicle electronic system.

In one of the exemplary embodiments, the role of the in-vehicle electronic system may include a driver in-vehicle electronic system and a passenger in-vehicle electronic system.

In one of the exemplary embodiments, the transmission and reception of data with the mobile electronic device would be restricted by the mobile electronic device if the role of in-vehicle electronic system is the driver in-vehicle electronic system and the transmission and reception of data with the mobile electronic device would not be restricted if the in-vehicle electronic system were the passenger in-vehicle electronic system.

In one of the exemplary embodiments, the in-vehicle electronic system would restrict the transmission and reception of data with the mobile electronic device if the role of in-vehicle electronic system is the driver in-vehicle electronic system and the mobile electronic device would not restrict the transmission and reception of data with the in-vehicle electronic system if the in-vehicle electronic system were the passenger in-vehicle electronic system.

In one of the exemplary embodiments, the restriction of the transmission and reception of data is such that the transmission and reception of data by the driver in-vehicle electronic system is for incoming calls only. The restricted data could be temporarily stored in a buffered memory and would eventually be allowed to be transmitted or received when the vehicle is parked or in a complete stop.

In one of the exemplary embodiment, the present disclosure directs to a mobile electronic device which includes at least but not limited to a communication circuit and a processing circuit coupled to the communication circuit, wherein the processing circuit is configured for executing functions including establishing a connection with the in-vehicle electronic system through the communication circuit, receiving a profile setting of the in-vehicle electronic system through the connection after establishing the first connection with the in-vehicle electronic system, and controlling transmitting and receiving data through the communication circuit with the in-vehicle electronic system based on the profile setting of the in-vehicle electronic system, wherein the profile setting would vary based on the role of the in-vehicle electronic system. The mobile electronic device could also be configured to execute all the functions as disclosed in all of the embodiments.

In one of the exemplary embodiment, the present disclosure directs to an in-vehicle electronic system which includes at least but not limited to a communication circuit and a processing circuit coupled to the communication circuit, wherein the processing circuit is configured for executing functions including establishing a connection with a mobile electronic device through the communication circuit, transferring a profile setting to the mobile electronic device through the connection after establishing the first connection to the mobile device, and transmitting and receiving data with the mobile electronic device through the communication circuit according to the profile setting, wherein the profile setting would vary based on the role of the in-vehicle electronic system. The in-vehicle electronic system could also be configured to execute all the functions as disclosed in all of the embodiments.

In one of the exemplary embodiments, the interaction between a mobile electronic device and an in-vehicular electronic system could further be determined based on various dynamic factors in addition to the profile setting, wherein the profile setting would vary based on the role of the in-vehicle electronic system.

In one of the exemplary embodiments, in response to the mobile electronic device attaching to the in-vehicle electronic system, the operation for the driver role could be restricted in several ways. The driver in-vehicle electronic system could be restricted by locking the touch screen of the in-vehicle electronic system or by deactivating input to the touch screen of the in-vehicle electronic system or by interrupting the interaction between the touch screen of the driver in-vehicle electronic system and the mobile electronic device. The restriction of the driver role could also include restriction of the hardware interface of the in-vehicle electronic system such as buttons, knobs, dials. Otherwise, if the mobile electronic device attaches to a non-driver in-vehicle electronic system instead, the user is free to operate the touch screen and bottoms of the non-driver in-vehicle electronic system.

In one of the exemplary embodiments, the non-driver role may further includes a non-caller role such that a user may access entertainment features of the in-vehicle electronic system but would not be allowed to utilize communication related functions.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

Figure 1:
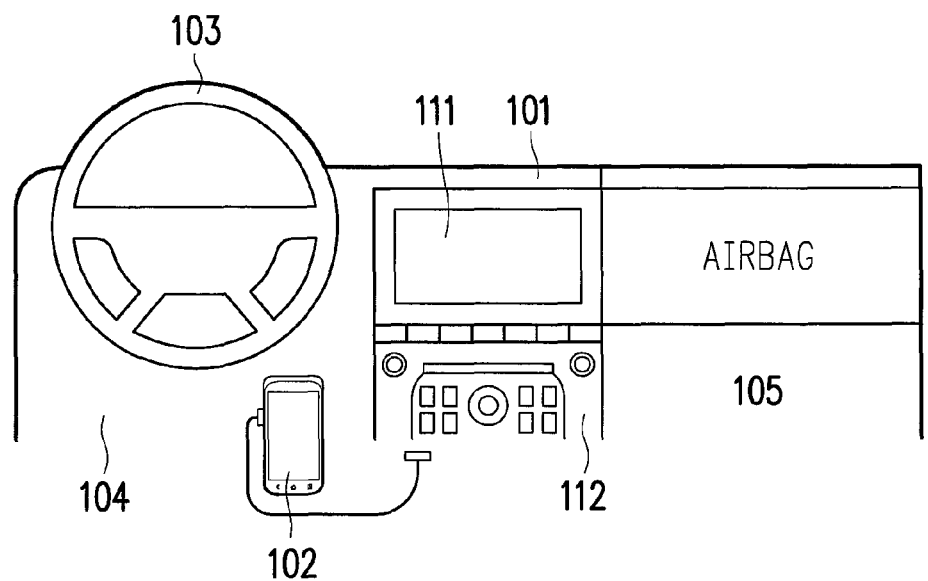
FIG. 1 illustrates a mobile electronic device interacting with an in-vehicle electronic system inside a motor vehicle.
Figure 2:
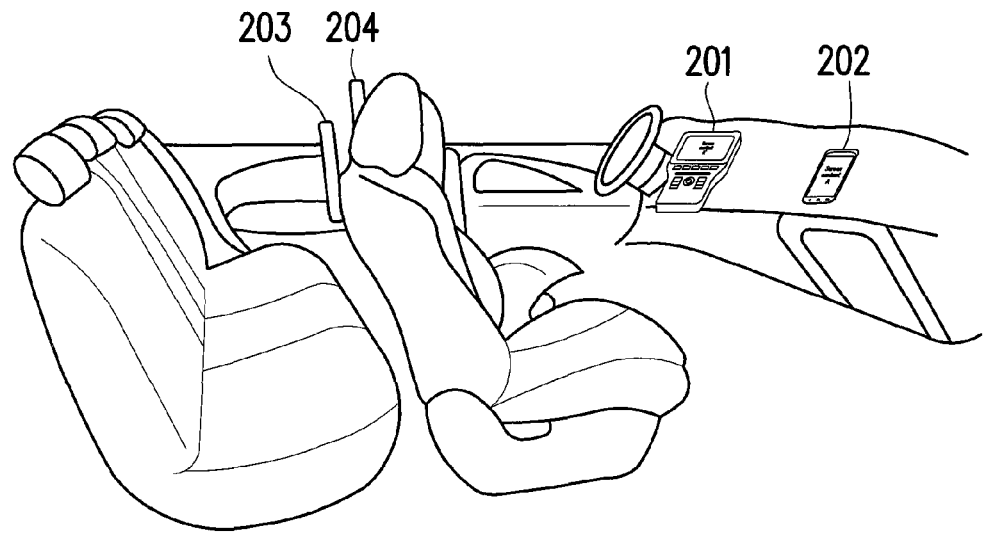
FIG. 2 illustrates multiple in-vehicle electronic system inside a motor vehicle in accordance with one of the exemplary embodiments of the present disclosure.

FIG. 2 illustrates an overall proposed system of multiple in-vehicle electronic systems inside a motor vehicle in accordance with one of the exemplary embodiments of the present disclosure. In addition to an in-vehicle electronic systems 201 being accessible to a front row driver and situated next to a steering wheel, there could also be an in-vehicle electronic systems 202 in the front row passenger side, an in-vehicle electronic systems 203 in the backseat of the driver's side, or an in-vehicle electronic systems 204 in the backseat of the non-driver's side. However, the present disclosure is not limited to the exact arrangement of FIG. 2 as a third in-vehicle electronic system could be added to the backseat in between 203 and 204 or additional in-vehicle electronic systems could also be added in the case that there are multiple rows of backseats. For each of the in-vehicle electronic systems 201~204, a portable electronic device (not shown) could be plugged into each of the in-vehicle electronic systems 201~204 and thus host various applications. Each of the in-vehicle electronic systems 201~204 could be internally integrated into the mechanical structure and/or electrical system of the motor vehicle, but the in-vehicle electronic systems 202~204 could actually be externally coupled to the mechanical structure of the motor vehicle and may or may not directly connected electrically to the motor vehicle. Also in accordance with one of the exemplary embodiments, each of the electronic systems 201~204 could be independent and separately user configurable.

Figure 3A:
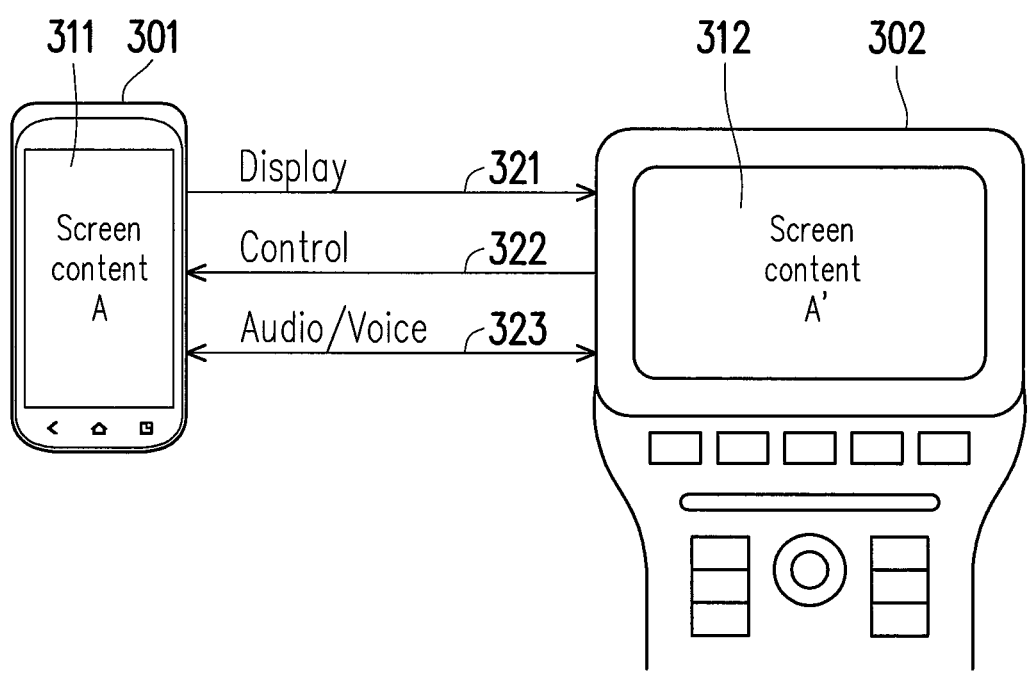
FIG. 3A illustrates a mobile electronic device interacting with an in-vehicle electronic system inside a motor vehicle in accordance with one of the exemplary embodiments of the present disclosure.

FIG. 3A illustrates a mobile electronic device interacting with an in-vehicle electronic system inside a motor vehicle in accordance with one of the exemplary embodiments of the present disclosure. When the mobile electronic device 301 is connected to the in-vehicle electronic system 302, the in-vehicle electronic system 302 would be switched to a remote viewing mode and would interact with the mobile electronic device 301 through an electrical hardware interface which may include a display interface 321, a control interface 322, and an audio/voice interface 323.

Through the display interface 321, the mobile electronic device 301 may transfer displayed content of its touch screen 311 to the touch screen 312 of in-vehicle electronic system 302 such that the screen content of the in-vehicle electronic system 302 could be a near mirror image or an identical image of the screen content of the mobile electronic device 301. The in-vehicle electronic system 302 in the remote viewing mode could be thought of as a temporary monitor, or a temporary projector, or a remote touch screen of the mobile electronic device 301. When a user operates on the touch screen 312 of the in-vehicle electronic system 302, the resulting control signal from the user operating on the touch screen 312 is transferred to the mobile electronic device 301 through the control interface 322 as though the touch screen 311 of the mobile electronic device 301 has been operated on such as the user may access functions and features of the mobile electronic device 301.

According to one embodiment, the control interface 112 of an in-vehicle electronic system 101 or 302 may contain a button which may temporarily switch the screen content of the touch screen 312 to a default home screen of the in-vehicle electronic system 302 so that when a user operates on the touch screen 312 of the in-vehicle electronic system 302, the user would be able to temporarily access the functions of the in-vehicle electronic system 302 instead of the mobile electronic device 301. When the user decides to unplug the mobile electronic device 301 from the in-vehicle electronic system 302, the operating system of the in-vehicle electronic system 302 would disable the remote viewing mode and resume the normal operation of the in-vehicle electronic system 302.

The aforementioned electrical hardware interface would further include a two way audio/voice interface 323 which could transfer audio or voice signal between the mobile electronic device 301 and the in-vehicle electronic system 302 both ways. For instance, a user may activate a music player from the mobile electronic device 301, and the music would be heard from the speaker of the in-vehicle electronic system 302. Likewise, a user may have a phone conversation through a microphone of the in-vehicle electronic system 302, and the audio voice would be transferred through the audio/voice interface 323 to the mobile electronic device 301 in order to be transmitted from the antenna of the mobile electronic device 301.

Figure 3B:
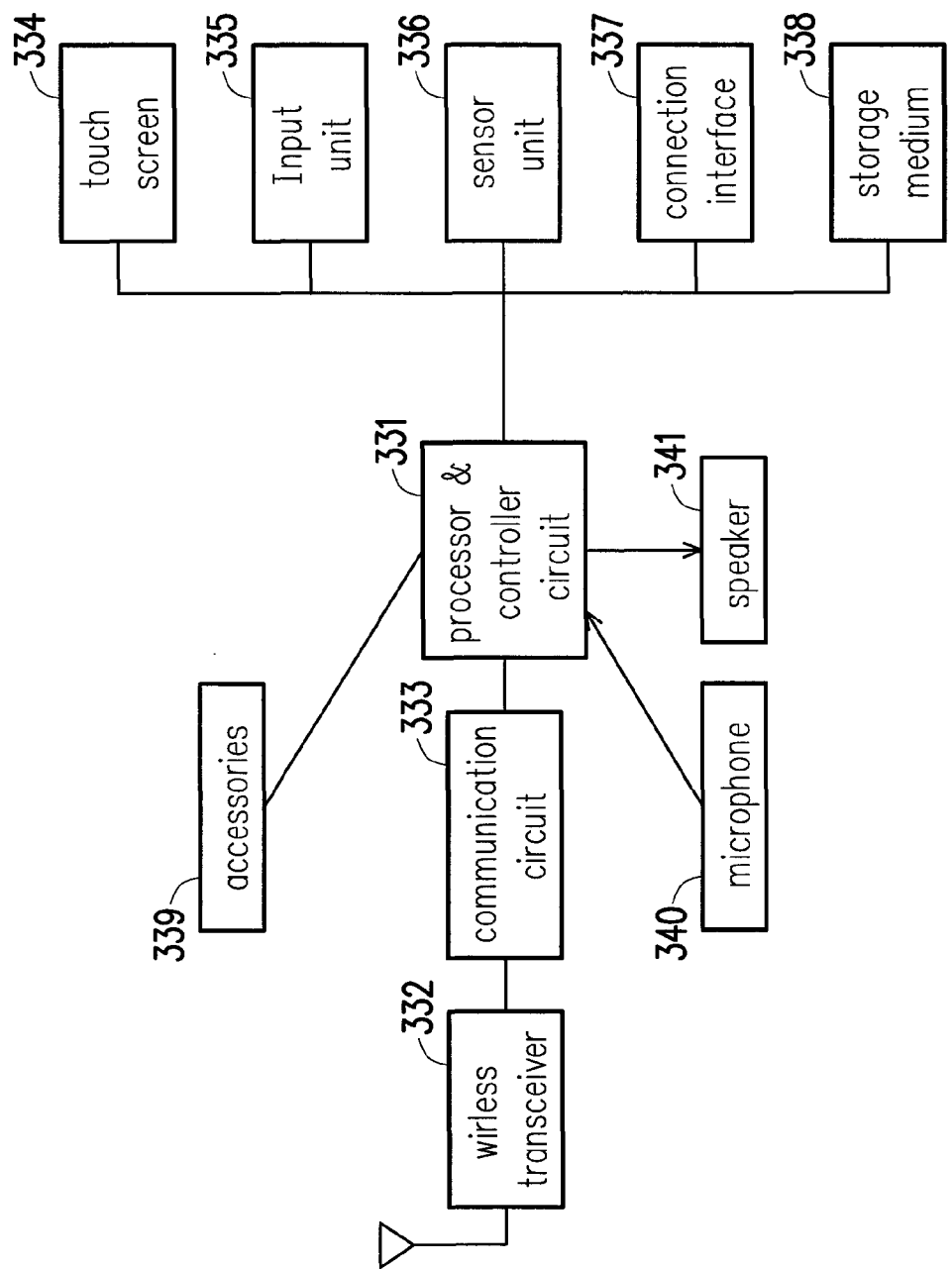
FIG. 3B illustrates the hardware of a mobile electronic device in terms of functional block diagrams in accordance with one of the exemplary embodiments of the present disclosure.

FIG. 3B illustrates the hardware of a mobile electronic device in terms of functional block diagrams in accordance with one of the exemplary embodiments of the present disclosure. An exemplary mobile electronic device 301 could be a smart phone, a mobile phone, a person digital assistant (PDA), a tablet, a notebook computer, and so forth.

An exemplary mobile electronic device 301 would include a processor and controller circuit 331. The processor and controller circuit 331 would be electrically coupled to at least but not limited to a wireless transceiver 332, communication circuit 333, a touch screen 334, an input unit 335, a sensor unit 336, a connection interface 337, a storage medium 338, accessories 339, and an audio controller interface which may include a speaker 341 and a microphone 340. The processor and controller circuit 331 may include a micro-controller, a North Bridge, a South Bridge, a field programmable array (FPGA), a programmable logic device (PLD), an application specific integrated circuit (ASIC), or other similar device, or a combination therefore. The processor and controller circuit 331 may also include a central processing unit (CPU) or a programmable general purpose or special purpose microprocessor, a digital signal processor (DSP), a graphics processing unit (GPU), an application specific integrated circuit (ASIC), a programmable logic device (PLD), or other similar device or a combination thereof, which is used for processing all tasks of the exemplary mobile electronic device 301.

The communication circuit 333 could be components which support signal transmissions of a global system for mobile communication (GSM), a personal handy-phone system (PHS), a code division multiple access (CDMA) system, a wireless fidelity (Wi-Fi) system or a worldwide interoperability for microwave access (WiMAX). The communication circuit 333 may be coupled to a wireless transceiver unit 332 to provide wireless access for the mobile electronic device 301. The wireless transceiver unit 332 may include but not limited to a transmitter circuit, a receiver circuit, an analog-to-digital (A/D) converter, a digital-to-analog (D/A) converter, a low noise amplifier (LNA), mixers, filters, matching networks, transmission lines, a power amplifier (PA), one or more antenna units, and a local storage medium. The transmitter and the receiver transmit downlink signals and receive uplink signals wirelessly. The receiver may include functional elements to perform operations such as low noise amplifying, impedance matching, frequency mixing, down frequency conversion, filtering, amplifying, and so forth. The transmitter may include function elements to perform operations such as amplifying, impedance matching, frequency mixing, up frequency conversion, filtering, power amplifying, and so forth. The analog-to-digital (A/D) or the digital-to-analog (D/A) converter is configured to convert from an analog signal format to a digital signal format during uplink signal processing and from a digital signal format to an analog signal format during downlink signal processing.

The touch screen 334 may contain a display such as a liquid crystal display (LCD), a light-emitting diode (LED) display, a field emission display (FED) or other types of display. The input unit 335 could be, for example, an input device such as a mouse, a keyboard, a joystick, a wheel, and so forth and would receive an input operation from a user. The input unit 335 may also include a resistive, a capacitive or other types of touch sensing device which would be integrated as a part of the touch screen 334.

The sensor unit 336 may contain various sensors such as a G-sensor, a gyroscope, a motion sensor, a proximity sensor, and so forth.

The connection interface 337 could be, for example, a cable interface such as a universal serial bus (USB) or a wireless interface such as Bluetooth. The connection interface 337 could be a serial interface such as RS232 interface or could be a parallel interface such as USB or Firewire.

The storage medium 338 could volatile or permanent memories which would store buffered or permanent data such as compiled programming codes used to execute functions of the exemplary mobile electronic device 301.

Figure 3C:
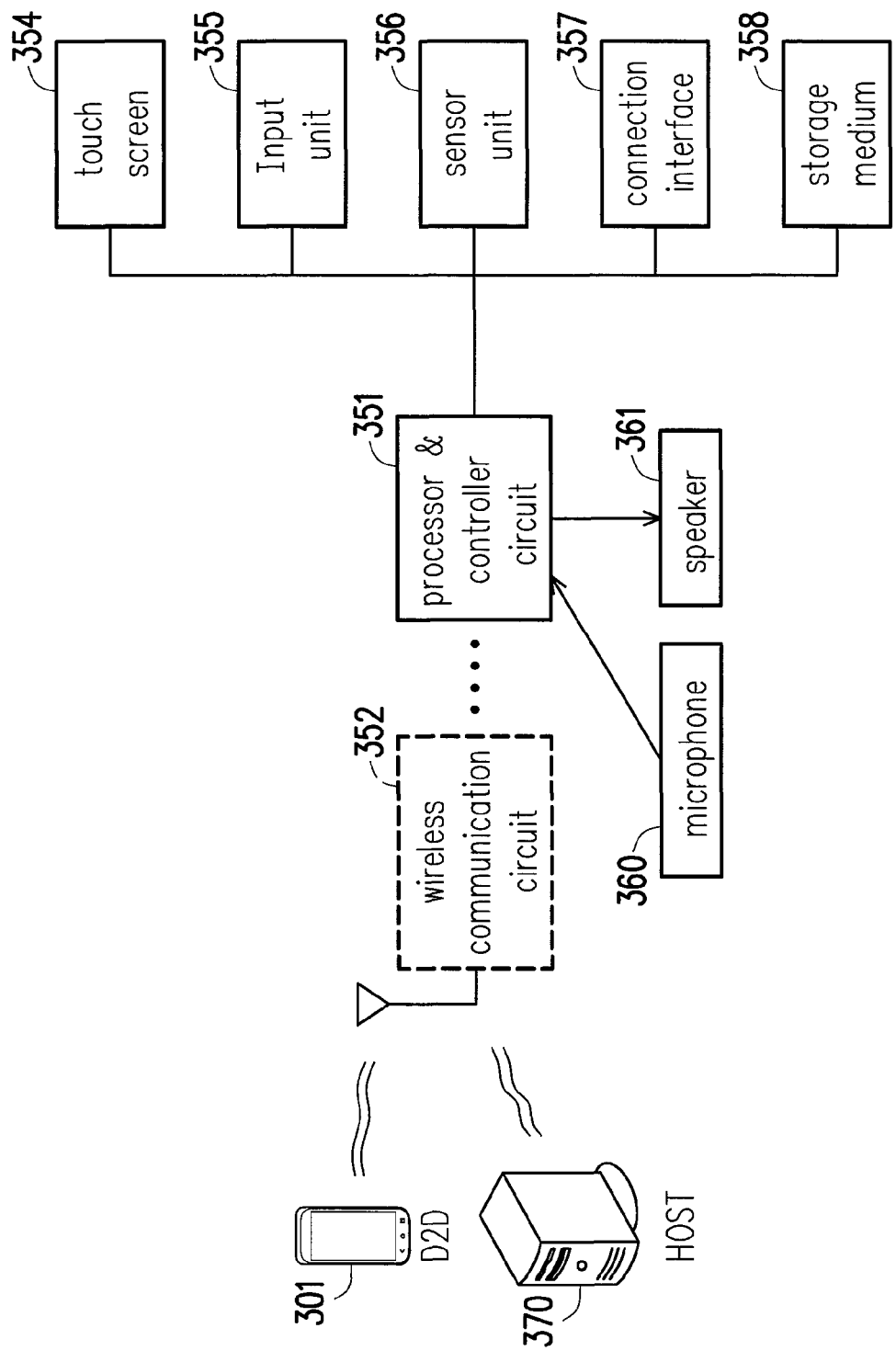
FIG. 3C illustrates the hardware of an in-vehicle electronic system in terms of functional block diagrams in accordance with one of the exemplary embodiments of the present disclosure.

FIG. 3C illustrates the hardware of an in-vehicle electronic system in terms of functional block diagrams in accordance with one of the exemplary embodiments of the present disclosure. An exemplary in-vehicle electronic system 302 may include at least but not limited to a processor & control circuit 351, a touch screen 354, an input unit 355, a sensor unit 356, a connection interface 357, a storage medium 358, a microphone 360, and a speaker 361. Functionally these elements would be similar to a mobile electronic device 301 and hence the same descriptions will not be repeated.

An in-vehicle electronic system 302 may further include a wireless communication circuit 352 so that the interaction between the mobile electronic device 301 and the in-vehicle electronic system 302 could occur over a variety of transports. The mobile electronic device 301 may either plug into the in-vehicle electronic system 302 through their connection interfaces 337 357 such as USB, or they may inter-connect wirelessly through a free spectrum such as using the Bluetooth or Wifi technology. Furthermore, the in-vehicle electronic system 302 may also wireless connect to an external host 370 which is not native to the motor vehicle.

The communication protocol between the connection interfaces 337 357 or between the wireless circuits 332 352 could be based on a version of the MirrorLink communication protocol. However, the present disclosure is not limited to MirrorLink as a person of ordinary skill in the art may substitute other protocols to implement various concepts of the present disclosure.

The method of the present disclosure is premised upon the concept that certain functions of a mobile electronic device would be restricted during certain circumstances; however, the level of restriction would not apply universally to all in-vehicle electronic systems but would be different according to the role of each in-vehicle electronic system. In one exemplary embodiment, the driver role or the driver in-vehicle electronic system would be imposed with restrictions while in-vehicle electronic system elsewhere would be unrestricted or less restricted. In other words, the role of the in-vehicle electronic system would determine the level of restriction on the accessible functions of a mobile electronic device. The restriction could be implemented through a profile settings which could be a default profile setting or a user customized profile setting.

According to one exemplary embodiment, a customized profile setting is not available as the profile setting cannot be user defined in order to minimize tempering of the originally intended safety restriction. In this embodiment, different roles (i.e. driver, front seat passenger, rear seat passengers) would have different profile settings, and in general the driver would be the most restrictive and rear seat passengers would be the least restrictive.

In one exemplary embodiment, profile setting controls the interaction between the mobile electronic device and the in-vehicle electronic system merely by explicitly stating the role of the in-vehicle electronic device in the profile setting so that the profile setting is very easy to configure. After the mobile electronic device obtains the role of the in-vehicle electronic device through the profile setting, the mobile electronic device would then automatically apply restrictions by default according to the role of the in-vehicle electronic device.

According to another exemplary embodiment, the user customized profile setting is available and could be configured based on discrete levels such that different functions could be enabled or disable altogether for each level as higher levels would have more functions restricted than lower level. The profile setting could also be configured by choosing a discrete package or by selecting functions on a function by function basis. However, regardless of how the profile setting is customized, the driver in-vehicle electronic system would be more restricted than non-driver in-vehicle electronic systems In one exemplary embodiment, the regulation related information could be downloaded automatically through a wireless communication circuit 332 333 352 so that the profile setting could be customized based on the location of the motor vehicle. For instance, when a vehicle travels to a US state where text messaging is banned, such regulation related information would be known by an external server. The external server could disseminate such information from a service website. When the in-vehicle electronic device 302 or the mobile electronic device 301 accesses the service website, such regulation related information could automatically downloaded from the external server in order to be integrated into the default profile setting so that text messaging would be automatically disabled in the driver in-vehicle electronic system when a driver is driving a motor vehicle.

Figure 4A:
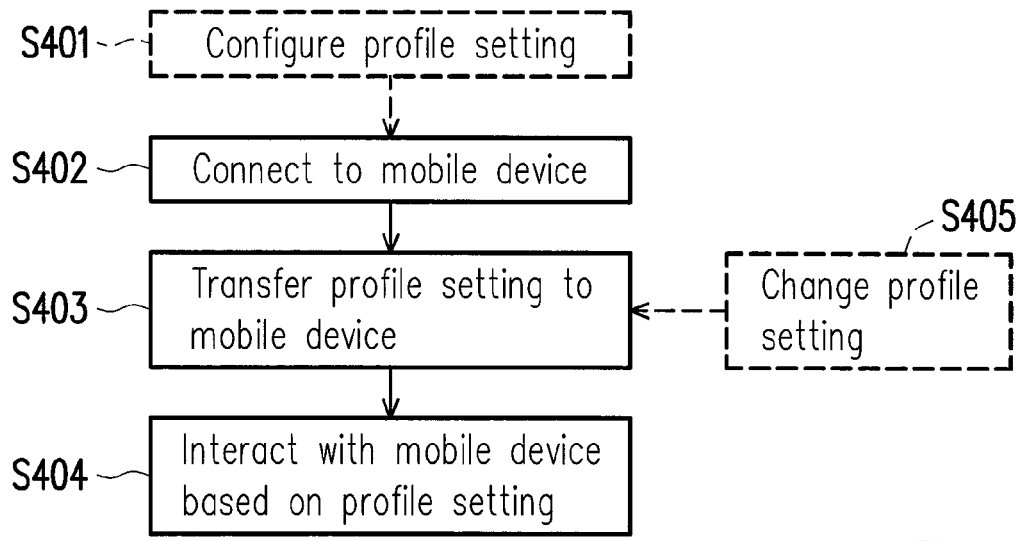
FIG. 4A illustrates a method of controlling interaction through profile settings between an in-vehicle electronic system and a mobile electronic device from the perspective of the in-vehicle electronic system in accordance with one of the exemplary embodiments of the present disclosure.

FIG. 4A illustrates a method of controlling interaction through profile settings between an in-vehicle electronic system and a mobile electronic device from the perspective of the in-vehicle electronic system in accordance with one of the exemplary embodiments of the present disclosure, and FIG. 4A operates as follows. In optional step S401, a user may optionally configure or customize the profile settings of an in-vehicle electronic system, or otherwise the default profile setting would be adopted by default. The profile settings could be configured through a system menu of the in-vehicle electronic system by changing the restriction level, the package setting or by checking and un-checking boxes next to each functional descriptions. However, the present disclosure does not limit the manners of configuring the profile settings. For exemplary purpose, it is assumed that the default setting would be used. In step S402, a connection would be established so that the in-vehicle electronic system would be actively connected to a mobile electronic device. An active connection includes the assumption that the mobile electronic device is turned on and would be in the position to engage the in-vehicle electronic system. The connection could be through connection interfaces (e.g. 337, 357, such as USB interface) or through direct wireless connection over free spectrums such as Wifi or Bluetooth through communication circuits (e.g. 332, 333, 352). In step S403, when the in-vehicle electronic system is connected to the mobile electronic device, the in-vehicle electronic system in response would transfer the profile setting to the mobile electronic device. Assuming that a default profile setting is used, the profile setting would explicitly indicate the role of the in-vehicle electronic system. In step S404, after the profile setting has been transferred to the mobile device, the in-vehicle electronic system would interact with the mobile electronic device based on the aforementioned principle as described under FIG. 3A, namely, the touch screen 312 of the in-vehicle electronic system 302 would function like a remote touch screen of the touch screen 311 of the mobile electronic device 301, and the mobile electronic device 301 would host applications to provide various functions and features. However, the mobile electronic device may restrict the functions and features provided for the in-vehicle electronic system. In optional step S405, whenever a user alters the profile setting in an in-vehicle electronic system, the profile setting would be transfer over to the mobile electronic device automatically as long as the in-vehicle electronic system is actively connected to the mobile electronic device, and the mobile electronic device would immediately be operating according to the updated profile setting.

Figure 4B:
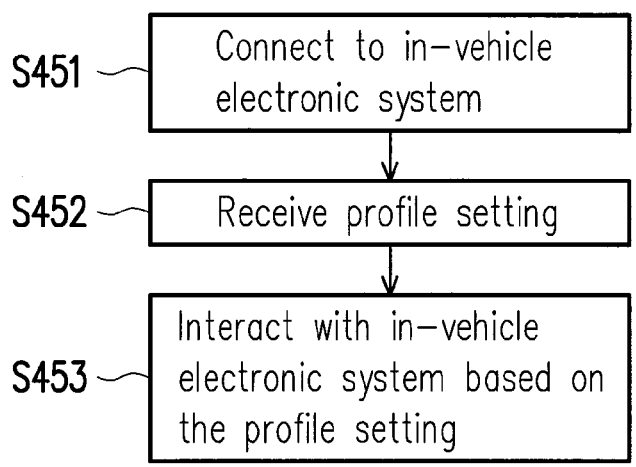
FIG. 4B illustrates a method of controlling interaction through profile settings between an in-vehicle electronic system and a mobile electronic device from the perspective of the mobile electronic device in accordance with one of the exemplary embodiments of the present disclosure.

FIG. 4B illustrates a method of controlling interaction through profile settings between an in-vehicle electronic system and a mobile electronic device from the perspective of the mobile electronic device in accordance with one of the exemplary embodiments of the present disclosure. In step S451, the mobile electronic device has established an active electrical connection with an in-vehicle electronic system. The connection between the mobile electronic device and the in-vehicle electronic system could be a cable connection through a serial interface or could be a direct wireless connection. In one exemplary embodiment, the connection could be based on a MirrorLink protocol or any other protocol. In step S452, the mobile electronic device would receive a profile setting from the in-vehicle electronic system. The profile setting could be a customized profile setting or a default profile setting. For exemplary purpose, assuming that a default profile setting has been obtained, the mobile electronic device would obtain from the default profile setting the role of the in-vehicle electronic system as the role would be explicitly indicated in the default profile setting. In some cases, the role of in-vehicle could be deduced from the default profile setting without being made explicit such as when the in-vehicle electronic system is built in and permanently fixed to the motor vehicle. In step S453, the mobile electronic device would interact with the in-vehicle electronic system based on the role as indicated in the default profile setting.

More specifically, in step S453, after the mobile electronic device has received the profile setting, the mobile electronic device may restrict the functions or certain features hosted by the mobile electronic device according to the role defined in profile setting or according to customized profile setting. The purpose of the restriction is to minimize distractions by eliminating non-essential or distracting features provided by the mobile electronic device. For instance, the mobile electronic device could restrict the access to entertainment features such as music or movies by choosing not to activate them or by choosing not to transmit data over the connection interface 321 322 323. The mobile electronic device would also restrict the usage of text messages or instant messages by blocking them or by not transmitting them through the control interface. The mobile electronic device would by default allow music and notifications of incoming phone calls, since music and picking up an incoming phone call would be considered less distracting. Placing an outgoing call would be restricted by default since it would be considered distracting for a driver to look up a phone number and to press buttons to make a call. However, if the role as defined in the profile setting has indicated that the in-vehicle electronic system is a non-driver role, then mobile electronic device may apply full access to the user of the in-vehicle electronic system.

In another exemplary embodiment, incoming calls would not be allowed for the role of driver in-vehicle electronic system as long as the motor vehicle is moving, if the vehicle electronic system has determined that the current location has banned cell phone conversations while driving.

In another exemplary embodiment, the mobile electronic device would not restrict access by choosing not to access certain programs or by blocking certain functions and notifications. But instead, the in-vehicle electronic system would restrict the transmission and reception of data with the mobile electronic device if the role of in-vehicle electronic system is the driver in-vehicle electronic system and the in-vehicle electronic system would not restrict the transmission and reception of data with the in-vehicle electronic system if the in-vehicle electronic system were the passenger in-vehicle electronic system. The driver in-vehicle electronic system may restrict access by restricting the data transmission in the audio/voice interface 323 and the data transmission in the display interface 321. For instance, the In-vehicle electronic system may utilizes its own processor & controller circuit 351 to block the transmission of phone calls, music, and movies from the mobile electronic device as well as filtering out text messages except for incoming phone calls.

In one of the exemplary embodiments, in response to the mobile electronic device attaching to the in-vehicle electronic system, the operation for the driver role could be restricted in several ways. The driver in-vehicle electronic system could be restricted by locking the touch screen 312 of the in-vehicle electronic system or by deactivating input to the touch screen in-vehicle electronic system or by interrupting the interface 321 322 323 between the touch screen 312 of the driver in-vehicle electronic system and the mobile electronic device. The restriction of the driver role could also include restriction of the hardware interface of the in-vehicle electronic system such as buttons, knobs, dials. Otherwise, if the mobile electronic device attaches to a non-driver in-vehicle electronic system instead, the user is free to operate the touch screen and bottoms of the non-driver in-vehicle electronic system. Otherwise, if the mobile electronic device attaches to a non-driver in-vehicle electronic system instead, the user is free to operate the touch screen of the non-driver in-vehicle electronic system.

In one of the exemplary embodiments, the non-driver role may further includes a non-caller role such that a user may access entertainment features of the in-vehicle electronic system but would not be allowed to utilize communication related functions. For example, if the in-vehicle electronic system were meant to be operated by children, the profile setting of the in-vehicle electronic system could configure a restricted passenger role which restrict the passenger in-vehicle electronic system but in a different way relative to the driver in-vehicle electronic system. In this case, the restricted passenger role of the in-vehicle electronic system could not access communication functions such as phone calls, emails, messages but could otherwise have full access to all other functions.

In one of the exemplary embodiments, the restriction of the transmission and reception of data between the mobile electronic device and the in-vehicle electronic system could be either further restricted or relaxed based on a dynamic consideration of the motor vehicle. For instance, when a motor vehicle is parked or is not parked but in a complete stop, all functions and features provided by a mobile electronic device would be unrestricted for all roles of the in-vehicle electronic systems. When a motor vehicle is parked for example, the in-vehicle electronic system may either transmit an independent signal to the mobile electronic device signaling that all functions and features could be allowed or the in-vehicle electronic system may transmit to the mobile electronic device an updated profile setting indicating that the motor vehicle has been parked.

In another exemplary embodiment, the dynamic consideration could be related to road conditions as experienced by a mobile electronic device such that a restriction would be relaxed if the mobile electronic device experiences stable road conditions. Since a mobile electronic device is equipped with various sensors such as a G-sensor or a gyro-sensor, the mobile electronic device would measure the acceleration and the angular momentum of the mobile electronic device. For instance, when an in-vehicle electronic system has informed a mobile electronic device that it is below a certain threshold and at the same time a driver does not make a sharp turn or accelerate beyond an acceleration threshold or decelerate the vehicle beyond a deceleration threshold such as by hitting the breaks over a predetermined period of time, all functions and features would be unrestricted by the mobile electronic device.

In one exemplary embodiment, the dynamic consideration could be related to sensor readings obtained by an in-vehicle electronic device such that restrictions would be further restricted if the sensor readings of the motor vehicle exceed a certain limit. For instance, if the speedometer has exceeded a certain threshold or if the vehicle has accelerated or decelerated beyond a certain threshold, the in-vehicle electronic system could either inform such event to the mobile electronic device in order for functions and features to be further restricted or the in-vehicle electronic system could disable certain functions such as by not allowing incoming calls, or by disabling music to be played for the driver in-vehicle electronic system.

In one exemplary embodiment, the dynamic consideration could be related to driver availability as detected by an in-vehicle electronic device such that restrictions would be further restricted if the driver has been determined to be busy operating the motor vehicle. For instance, if the vehicle has accelerated and/or decelerated a number of times over a predetermined period, the driver could be determined to be busy operating the motor vehicle since this would mean that the driver is frequently hitting the gas pedal or the breaks. When the combined number of acceleration and decelerate exceeds a certain threshold over a predetermined time, such as 10 times over a minute which is indicative of a stop and go traffic condition, the in-vehicle electronic system could either inform such event to the mobile electronic device in order for functions and features to be further restricted, or the in-vehicle electronic system could disable certain functions such as by not allowing incoming calls or by disabling music to be played.

In one exemplary embodiment, the dynamic consideration could be related to environmental conditions obtained by an in-vehicle electronic device such that restrictions would be further restricted if the environmental condition has been determined to unfavorable. For instance, if anti-lock breaks have been triggered to indicate snowy condition, the in-vehicle electronic system could either inform such event to the mobile electronic device in order for functions and features to be further restricted, or the in-vehicle electronic system could disable certain functions such as by not allowing incoming calls or by disabling music to be played.

In one exemplary embodiment, the dynamic consideration could be related to traffic condition obtained by an in-vehicle electronic device such that restrictions would be further restricted if the traffic condition has been determined to unfavorable through a connection with a wireless network. For instance, if the in-vehicle electronic system has logged into a server to obtain traffic information which has then be determined to be below a certain predetermined rating, the functions and features of the mobile electronic device would be further limited.

In one exemplary embodiment, the dynamic consideration could be related to environmental conditions obtained by an in-vehicle electronic device such that restrictions would be further restricted if certain features of the motor vehicle has been turned on. For instance, if the night visual assistance program of the in-vehicle electronic system has been turn on, or if the headlight of the motor vehicle is determined to be in the high beam mode, functions and features of the mobile electronic device would be further restricted by either having the in-vehicle electronic system transmitting a signal restricting certain feature(s) such as incoming calls or music or by having the in-vehicle electronic system disabling or block such features.

Figure 5A:
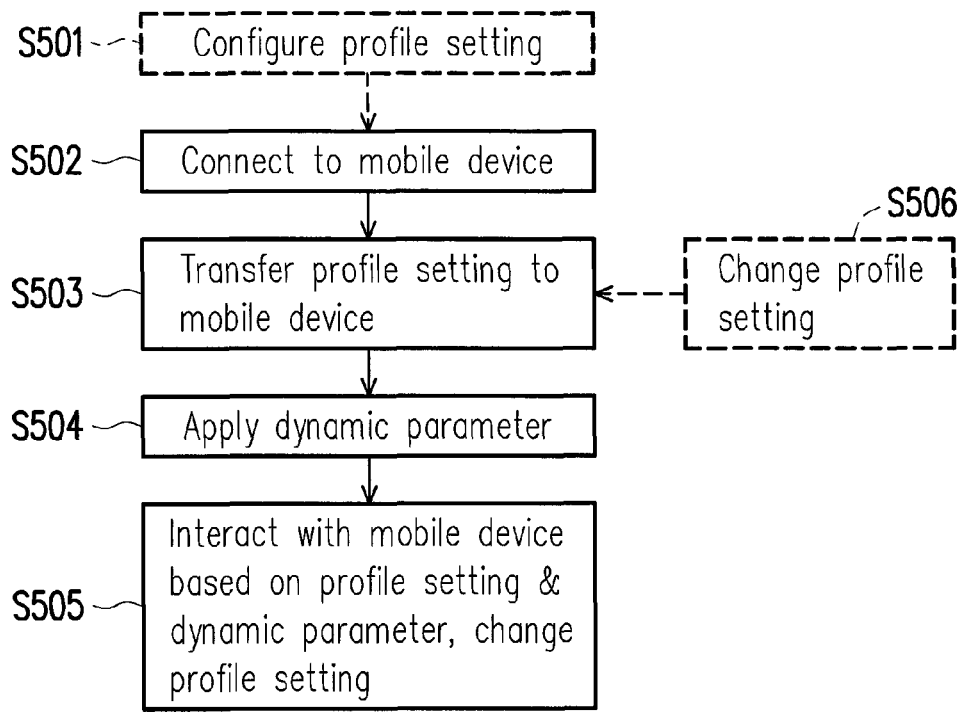
FIG. 5A illustrates another embodiment of controlling interaction between an in-vehicle electronic system and a mobile electronic device from the perspective of the in-vehicle electronic system in accordance with one of the exemplary embodiments of the present disclosure.

FIG. 5A illustrates another embodiment of controlling interaction between an in-vehicle electronic system and a mobile electronic device from the perspective of the in-vehicle electronic system in accordance with one of the exemplary embodiments of the present disclosure. In optional step S501, a user may optionally configure or customize the profile settings of an in-vehicle electronic system, or otherwise the user adopt the default profile setting. The profile settings could be indicating that each function provided by a mobile electronic device should be turned on or off individually, or the profile setting could indicate the role of the in-vehicle electronic system. In step S502, a connection would be established between the in-vehicle electronic system and the mobile electronic device so that the in-vehicle electronic system would be actively connected to a mobile electronic device. The connection could be through a connection interfaces (e.g. 337, 357, such as USB interface) or through direct wireless connection over free spectrums such as Wifi or Bluetooth through communication circuits (e.g. 332, 333, 352). In step S503, when the in-vehicle electronic system is connected to the mobile electronic device, the in-vehicle electronic system would in response transfer the profile setting to the mobile electronic device. Assuming that a default profile setting is used, the profile setting would explicitly indicate the role of the in-vehicle electronic system by default.

In step S504, after the profile setting has been transferred to the mobile device, the in-vehicle electronic system would apply various dynamic considerations in order to determine whether to relax or further restrict the restriction currently imposed on the in-vehicle electronic system as a driver in-vehicle electronic system would be restricted while a non-driver in-vehicle electronic system would access all functions and features of a mobile electronic device in an unrestricted manner. The various dynamic consideration could be any one or any combination of the aforementioned dynamic considerations and therefore a complete description will not be repeated. In step S505, the in-vehicle electronic system would interact with the mobile electronic device based on the profile settings as well as dynamic considerations. In optional step S506, whenever a user alters the profile setting in an in-vehicle electronic system, the profile setting would be transferred over to the mobile electronic device automatically as long as the in-vehicle electronic system is actively connected to the mobile electronic device, and the mobile electronic device would immediately be operating according to the updated profile setting.

Figure 5B:
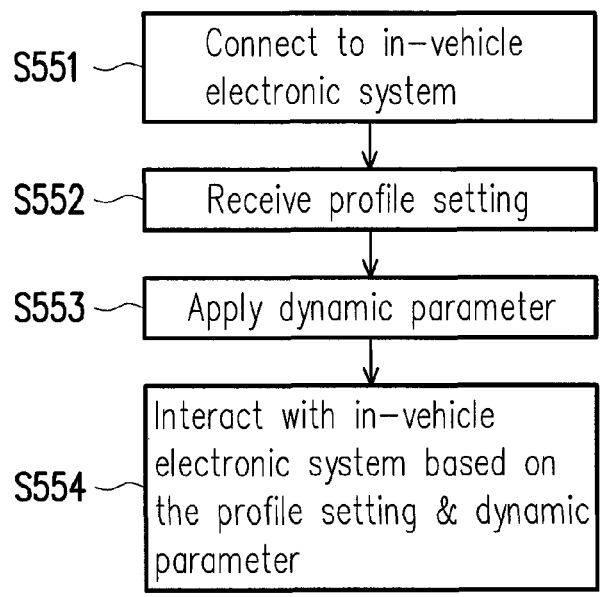
FIG. 5B illustrates another embodiment of controlling interaction between an in-vehicle electronic system and a mobile electronic device from the perspective of the mobile electronic device in accordance with one of the exemplary embodiments of the present disclosure.

FIG. 5B illustrates another embodiment of controlling interaction between an in-vehicle electronic system and a mobile electronic device from the perspective of the mobile electronic device in accordance with one of the exemplary embodiments of the present disclosure. In step S551, the mobile electronic device would establish an active electrical connection with an in-vehicle electronic system. The connection between the mobile electronic device and the in-vehicle electronic system could be a cable connection through a serial interface or could be a direct wireless connection. In one exemplary embodiment, the connection could be based on a MirrorLink protocol or any other protocol. In step S552, the mobile electronic device would receive a profile setting from the in-vehicle electronic system. The profile setting could be a customized profile setting or a default profile setting. For exemplary purpose, assuming that a default profile setting has been obtained, the mobile electronic device would extract from the default profile setting the role of the in-vehicle electronic system as the role would be explicitly indicated in the default profile setting. In step S553, after receiving the profile setting from the in-vehicle electronic system, the mobile electronic device would determine whether to relax or to further restrict the functions and features provided to the in-vehicle electronic system in addition to the level of restriction as indicated by the profile setting. The dynamic consideration could include signals received from the in-vehicle electronic system or calculations performed from readings of various sensors which are native to the mobile electronic device. The dynamic consideration could any one or any combination of the aforementioned dynamic considerations and hence a complete description will not be repeated. In step S554, the mobile electronic device would interact with the in-vehicle electronic system based on (the role as indicated by) the default profile setting as well as the dynamic considerations.

More specifically, in step S554, the mobile electronic device would determine the functions and features provided to the in-vehicle electronic device based on the role as defined in the profile setting. If the profile setting has indicated that the in-vehicle electronic system has a non-driver role, then mobile electronic device may apply full access to the user of the in-vehicle electronic system. If the profile setting has indicated that the in-vehicle electronic system has a driver role, then by default the functions and features may only include music and incoming calls. The mobile electronic device may then determine whether to relax or to further restrict the functions and features based on dynamic considerations.

In view of the aforementioned descriptions, the present disclosure extend the functions of an in-vehicle electronic system by incorporating various functions of a mobile electronic device into an in-vehicle electronic system not just for a driver of a motor vehicle but also for all passengers as each passenger could plug in one's mobile electronic device into a separate in-vehicle electronic system. The disclosure minimizes distractions caused by potentially distracting applications by dividing all in-vehicle electronic systems into separate roles. While functions provided for the driver role may be restricted, functions provided for non-driver role could be unrestricted or less restricted. Dynamic considerations could be applied to further relax or restrict the restriction imposed on the driver role.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

Moreover, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. A method of controlling the interaction between a mobile electronic device and in-vehicle electronic systems comprising a driver in-vehicle electronic system and a non-driver in-vehicle electronic system, adapted for a mobile electronic device, the method comprising:
    establishing a connection with one of the in-vehicle electronic systems;
    receiving a setting of the one of the in-vehicle electronic system through the connection in response to establishing the connection with the in-vehicle electronic system;
    determining whether the setting belongs to the driver in-vehicle electronic system or the non-driver in-vehicle electronic system; and
    controlling transmitting and receiving of data differently based on whether the setting of the in-vehicle electronic system is the setting belonging to the driver in-vehicle electronic system or the non-driver in-vehicle electronic system.

2. The method of claim 1, wherein the non-driver in-vehicle electronic system is a passenger in-vehicle electronic system.

3. The method of claim 2, wherein the setting of the driver in-vehicle electronic system is different from the setting of the passenger in-vehicle electronic system.

4. The method of claim 3, wherein the transmitting and receiving of data are performed in a restricted manner if the in-vehicle electronic system is the driver in-vehicle electronic system and the transmitting and receiving of data are performed in an unrestricted manner if the in-vehicle electronic system is the non-driver in-vehicle electronic system.

5. The method of claim 4, wherein the transmitting and receiving of data for the driver in-vehicle electronic system are incoming calls and/or music only.

6. The method of claim 4, wherein the step of the transmitting and receiving of data are performed in a restricted manner if the in-vehicle electronic system is the driver in-vehicle electronic system further comprises:
    restricting the transmitting and receiving of data triggered by at least one of a touch screen or a hardware user interface of the driver in-vehicle electronic system.

7. The method of claim 1, wherein the connection is either a serial connection through a cable or a direct wireless connection over a free spectrum.

8. A method of controlling the interaction between a mobile electronic device and in-vehicle electronic systems, adapted for an in-vehicle electronic system that is within a vehicle and comprises a driver in-vehicle electronic system and a non-driver in-vehicle electronic system, the method comprising:
    establishing a connection with a mobile electronic device;
    transferring a setting of different settings based on whether the in-vehicle electronic system is the driver in-vehicle electronic system or the non-driver in-vehicle electronic system to the mobile electronic device through the connection in response to establishing the connection to the mobile device; and
    transmitting and receiving data from the mobile electronic device differently according to the different settings.

9. The method of claim 8, wherein the non-driver in-vehicle electronic device is a passenger in-vehicle electronic device.

10. The method of claim 9, wherein the setting of the driver in-vehicle electronic system is different from the passenger in-vehicle electronic system.

11. The method of claim 10, wherein the transmitting and receiving of data are performed in a restricted manner if the in-vehicle electronic system is the driver in-vehicle electronic system and the transmitting and receiving of data are performed in an unrestricted manner if the in-vehicle electronic system is the non-driver in-vehicle electronic system.

12. The method of claim 11, wherein the transmitting and receiving of data for the driver in-vehicle electronic system are incoming calls and/or music only.

13. The method of claim 8, wherein the connection is either a serial connection through a cable or a direct wireless connection over a free spectrum.

14. A mobile electronic device comprising a communication circuit and a processing circuit coupled to the communication circuit, wherein the processing circuit is configured for:

establishing a connection with one of a plurality of in-vehicle systems which comprise a driver in-vehicle electronic system and a non-driver in-vehicle electronic system;

receiving a setting of the one of the in-vehicle electronic system through the connection in response to establishing the connection with the in-vehicle electronic system;

determining whether the setting belongs to the driver in-vehicle electronic system or the non-driver in-vehicle electronic system; and controlling transmitting and receiving of data differently based on whether the setting of the in-vehicle electronic system is the setting belonging to the driver in-vehicle electronic system or the non-driver in-vehicle electronic system.

15. The device of claim 14, wherein the non-driver vehicular electronic device is a passenger in-vehicle electronic system.

16. The device of claim 15, wherein the processing circuit is further configured for transmitting and receiving data through the communication circuit in a restricted manner if the in-vehicle electronic system is the driver in-vehicle electronic system and the processing circuit is further configured for transmitting and receiving data through the communication circuit in an unrestricted manner if the in-vehicle electronic system is the non-driver in-vehicle electronic system.

17. The device of claim 16 wherein the processing circuit is configured for transmitting and receiving data through the communication circuit in the restricted manner if the in-vehicle electronic system is the driver in-vehicle electronic system, the processing circuit further configured for:

restricting the transmitting and receiving of data through the communication circuit triggered by at least one of a touch screen or a hardware user interface of the driver in-vehicle electronic system.

18. The device of claim 16, wherein the processing circuit is further configured for transmitting and receiving only incoming calls and/or music through the communication circuit if the in-vehicle electronic system is the driver in-vehicle electronic system.

19. The device of claim 14, wherein the connection established through the communication circuit is either a serial connection through a cable or a direct wireless connection over a free spectrum.

20. An in-vehicle electronic system comprising a communication circuit and a processing circuit coupled to the communication circuit, wherein the processing circuit is configured for:

establishing a connection with a mobile electronic device;

transferring a setting of different settings based on whether the in-vehicle electronic system is a driver in-vehicle electronic system or a non-driver in-vehicle electronic system to the mobile electronic device through the connection in response to establishing the connection to the mobile device; and transmitting and receiving data from the mobile electronic device differently according to the different settings.

21. The in-vehicle electronic system of claim 20, wherein the non-driver in-vehicle electronic system is a passenger in-vehicle electronic system.

22. The in vehicle-electronic system of claim 21, wherein the processing circuit is further configured for transmitting and receiving data through the communication circuit in a restricted manner if the in-vehicle electronic system is the driver in-vehicle electronic system and the processing circuit is further configured for transmitting and receiving data through the communication circuit in an unrestricted manner if the in-vehicle electronic system is the non-driver in-vehicle electronic system.

23. The in vehicle-electronic system of claim 22, wherein the processing circuit is further configured for transmitting and receiving only incoming calls and/or music through the communication circuit if the in-vehicle electronic system is a driver in-vehicle electronic system.

24. The in vehicle-electronic system of claim 23, wherein the connection established through the communication circuit is either a serial connection through a cable or a direct wireless connection over a free spectrum.

* * * * *